(12) United States Patent
Thatha et al.

(10) Patent No.: US 11,451,583 B2
(45) Date of Patent: Sep. 20, 2022

(54) SYSTEM AND METHOD TO DETECT AND BLOCK BOT TRAFFIC (71) Applicant: KAALBI TECHNOLOGIES PRIVATE LIMITED, Bengaluru (IN)

(72) Inventors: Rakesh Thatha, Bangalore (IN); Jyoti Kakatkar, Bangalore (IN)

(73) Assignee: Radware Ltd., Tel Aviv (IL)

( * ) Notice: Subject to any disclaimer, the term of this patent is extended or adjusted under 35 U.S.C. 154(b) by 464 days.

(21) Appl. No.: 16/364,710

(22) Filed: Mar. 26, 2019

(65) Prior Publication Data
US 2019/0222607 A1 Jul. 18, 2019

Related U.S. Application Data (63) Continuation of application No. PCT/IN2017/050447, filed on Oct. 4, 2017.

(30) Foreign Application Priority Data

Oct. 5, 2016 (IN) .............................. 201641034010

(51) Int. Cl.
*H04L 9/40* (2022.01)
*H04L 67/02* (2022.01)
(Continued)

(52) U.S. Cl.
CPC .......... *H04L 63/1466* (2013.01); *G06F 11/00* (2013.01); *G06F 15/16* (2013.01); *G06F 21/554* (2013.01); *G06F 21/57* (2013.01); *H04L 63/168* (2013.01); *H04L 67/02* (2013.01); *H04L 67/34* (2013.01); *G06Q 10/00* (2013.01); *H04L 2463/144* (2013.01)

(58) Field of Classification Search
CPC .......... G06F 15/16; G06F 15/17; G06F 11/00; G06F 21/554; G06F 21/57; H04L 51/12; H04L 63/10; H04L 63/14; H04L 63/20; H04L 63/1466; H04L 63/168; H04L 67/02; H04L 67/22; H04L 69/22; H04L 67/34; H04L 2463/144; G06Q 10/00
(Continued)

(56) References Cited

U.S. PATENT DOCUMENTS 6,170,017 B1 * 1/2001 Dias .................. H04L 63/08
709/235
8,204,984 B1 * 6/2012 Aziz .................. H04L 63/0227
709/224
(Continued)

OTHER PUBLICATIONS

The International Search Report and The Written Opinion for PCT/IN2017/050447, dated Dec. 14, 2017, Indian Patent Office, New Delhi, India.

*Primary Examiner* — Michael S McNally
(74) *Attorney, Agent, or Firm* — M&B IP Analysts, LLC (57) ABSTRACT

A system and method for bot detection utilizing storage variables are presented. The storage variables generated is used to analyze user behavior and distinguish human traffic from bot traffic. The system for detecting bot traffic using storage variables includes a client application, a computer network, a bot detector, a bot computer, a storage variable generator, and a server. The client device enables a user to access information through the client application. The storage variable generator is configured to generates a plurality of storage variables including counter storage variable. The bot detector analyses the presence of bots in incoming traffic.

24 Claims, 6 Drawing Sheets

(51) Int. Cl.
*G06F 15/16* (2006.01)
*G06F 21/57* (2013.01)
*G06F 11/00* (2006.01)
*G06F 21/55* (2013.01)
*H04L 67/00* (2022.01)
*G06Q 10/00* (2012.01)

(58) Field of Classification Search
USPC .......................................................... 726/23
See application file for complete search history.

(56) References Cited

U.S. PATENT DOCUMENTS

| | | | |
|---|---|---|---|
| 8,856,869 B1* | 10/2014 | Brinskelle | G06F 21/6218 726/2 |
| 9,673,979 B1* | 6/2017 | Poole | H04L 63/0807 |
| 10,326,789 B1* | 6/2019 | Vines | H04L 67/02 |
| 2004/0158741 A1* | 8/2004 | Schneider | G06F 21/562 726/24 |
| 2007/0255821 A1 | 11/2007 | Ge et al. | |
| 2010/0262457 A1 | 10/2010 | House | |
| 2012/0072925 A1* | 3/2012 | Jenkins | H04L 43/08 719/328 |
| 2014/0019488 A1* | 1/2014 | Wo | G06F 21/6218 707/784 |
| 2015/0051934 A1* | 2/2015 | Chakra | G06Q 10/1097 705/7.21 |
| 2016/0005029 A1* | 1/2016 | Ivey | G06Q 20/4016 705/44 |
| 2016/0219089 A1* | 7/2016 | Murthy | H04L 51/58 |
| 2017/0126718 A1* | 5/2017 | Baradaran | H04L 63/0281 |
| 2017/0149803 A1* | 5/2017 | Lo | H04L 63/123 |
| 2017/0257385 A1* | 9/2017 | Overson | H04L 63/1441 |

* cited by examiner

SYSTEM AND METHOD TO DETECT AND BLOCK BOT TRAFFIC

CROSS-REFERENCE TO RELATED APPLICATIONS

This application is a continuation of International Application No. PCT/IN2017/050447 filed Oct. 4, 2017 which claims the benefit of Indian Provisional Patent Application No. 201641034010 filed Oct. 5, 2016, the contents of which are hereby incorporated by reference.

BACKGROUND

Technical Field

The embodiments herein are related to a field of data communication. The embodiments herein are particularly related to a system and method for preventing web scraping, price scraping, content theft, account aggregation, API misuse, form spam, account takeover, ticket scalping, bid shilling, bid sniping and carding. The embodiments herein are more particularly related to a system and method for monitoring client requests to determine robot traffic.

Description of the Related Art

Currently, the web has become a powerful and indispensable means for people to obtain information. A person can obtain information by accessing a web server/server using a client application on a client device. The client device fetches information from the application hosted by the server/web server. When a request is made to the web server, the request is logged in a database.

However, the web servers are also accessed heavily by robots, programs that automatically traverse the web to create an index. Robots, also known as bots or spiders or web crawlers, retrieve a document and then retrieve all the linked documents contained with the initial retrieved document, rapidly spreading throughout the web application/website. Typically, robots systematically scan through every document on the web server. The robots are used by hackers in web browsers, client applications, simulators and emulators and is directly run on computers through programs/scripts to gather the content from the web server/server. Thus, there is need of system and method to prevent malicious access of the web servers/servers by bots for purposes like web scraping (web data extraction from websites and web applications using bots). Currently, these problems are addressed partially.

Existing technologies for detecting bots are based on rate limiting and speed of requests from an IP, honey pots (honey pots are traps set to detect bots), TCP/IP packet analysis, user-agent based detection and captcha based bot detection. Further, the existing system analyses known bot IP databases, identifying bots not following robot.txt to determine bot traffic.

However, the aforementioned techniques create false positives for bot detection as many of the IPs may be shared between multiple users. In some scenarios, beneficial crawlers and applications are caught in the bot detection trap due to client-side hardware limitations. Further, existing technologies does not disclose the generation of storage variables to analyze incoming traffic and identify bot traffic.

In view of the above discussion, there exists a need for a system and method for preventing malicious access of the web servers/servers by bots for purposes including web scraping, data extraction, spamming, and brute force password attack. Further, there exists a need for a system and method for analyzing user behavior for differentiating genuine users from bots. Further, there exists a need for a system and method that generates and manipulates storage variables to prevent malicious access of the web servers/servers by bots.

The above-mentioned shortcomings, disadvantages and problems are addressed herein, which will be understood by reading and studying the following specification.

OBJECTS OF THE EMBODIMENTS HEREIN

The primary object of the embodiments herein is to provide a system for monitoring client requests to prevent malicious access of the web servers/servers by bots.

Another object of the embodiments herein is to provide a system and a method that utilizes storage variables to analyze user behavior during client-server interaction for differentiating genuine users from bots.

Yet another object of the embodiments herein is to provide a system that generates a plurality of storage variables including unique identifier, counter storage variable, and page timestamp, to track a user's activity on the client application.

Yet another object of the embodiments herein is to provide a system that utilize storage variable combinations-based rules to analyze incoming traffic and determine bot traffic.

Yet another object of the embodiments herein is to provide a system that uses two different seeds to generate the two random numbers to generating a counter storage variable.

These and other objects and advantages of the embodiments herein will become readily apparent from the following detailed description taken in conjunction with the accompanying drawings.

SUMMARY

The shortcomings discussed in the prior art are addressed by a system and method for detecting bot traffic using storage variables. The embodiments herein disclose a system and method for preventing malicious access of the web servers/servers by bots by generating and analyzing a plurality of storage variables. The plurality of storage variables analyze human behavior to distinguish human traffic from bot traffic. According to the embodiments herein, the client application sends a data/content/action request to the web server/server. Along with the client request a bunch of storage variables are created which tracks the user's activity on the client application. The system envisaged by the embodiments herein generates a plurality of storage variables including a unique identifier, counter storage variable, timestamp when a client application sends a request to a server. The plurality of storage variables is used to further analyze activity of the client application to determine bot traffic.

According to an embodiment herein, a computer implemented method for detecting and blocking bots in a server/web server is disclosed. The method includes receiving a HTTP request from a client application by a connector module. Further, a plurality of storage variables corresponding to the HTTP request is generated by a storage variable generation module. Thereafter, an API call is initiated to a bot detection computer/server for every HTTP request generated from the client application. The API call initiates generation of 'A' storage variable, 'C' storage variable, and timestamp storage variable using a storage variable generation module present in the connector. Further, storage variables are injected in an HTTP response sent from the web server/server to the client application by a connector module. A JavaScript code snippet is injected into the HTTP response sent to the client application. The JavaScript code snippet is configured to collect client-side parameters. The JavaScript code snippet executes at the client application and sends client-side parameters to the bot detection server. The plurality of storage variables and client-side parameters are analyzed by the bot detection computer/server to detect bots. A bot signature database is generated in the bot detection computer/server, wherein the bot signature database is stored in the bot detection computer/server. A replica of bot signature database can also be stored in the web server/server. Further, action is taken on subsequent HTTP requests from the client application in response to detection of a bot, wherein the action includes one of blocking HTTP request, displaying captcha, and displaying fake data.

According to an embodiment herein, the step of analyzing the plurality of storage variables includes tracking visitors accessing the client application using 'A' storage variable and IP address of the client application. Further, the 'C' storage variable is incremented on each HTTP request from the client application. A visitor is determined as a bot when the 'C' storage variable is not incremented, wherein a bot without storage capabilities is incapable of incrementing the 'C' storage variable.

According to an embodiment herein, the step of analyzing the plurality of storage variables includes analyzing the 'A' and 'C' storage variables across a plurality of HTTP requests. Further, a spoofing of storage variables is determined if the 'C' storage variable remains same for the plurality of HTTP requests.

According to an embodiment herein, the step of analyzing the plurality of storage variables includes determining a visitor as a distributed bot when a constant 'A' storage variable is received from multiple IP address.

According to an embodiment herein, a visitor is determined as a bot when a single 'A' storage variable or IP address makes requests at a high rate.

According to an embodiment herein, the step of analyzing the plurality of storage variables includes analyzing time series anomalies between the plurality of HTTP requests and determining interarrival time between successive requests from the same IP or 'A' storage variable has a standard deviation close to zero.

According to an embodiment herein, the step of blocking requests comprises blocking requests by analysis with the replica of bot signature database and blocking requests by using an asynchronous feed. In the method of blocking requests by analysis with the replica of bot signature database, the HTTP request at the connector module are compared with the replica of bot signature database before initiating API call. Further, the HTTP response is provided to the client application immediately after analysis, thereby reducing a delay involved in providing HTTP response. Thereafter, the HTTP request is blocked when a bot is detected after comparison with the bot signature database. In the method of blocking requests by using an asynchronous feed, the HTTP response is provided to the client application immediately in response to the HTTP request. Further, data received through the API calls is analyzed at the bot detection computer/server to compute bot signatures. Subsequently, the computed bot signatures are provided asynchronously through a feed to the server/web server. The computed bot signatures can be blocked in one of a Content Delivery Network (CDN), Web Application Firewall (WAF), hardware appliance present at the server/web server. Further, consecutive HTTP request from a bot is blocked at one of a CDN, WAF, and hardware appliance using the computed bot signatures.

According to an embodiment herein, a system for detecting and blocking bots in a client application or webserver/server is disclosed. The system includes a client computing device or client computer, a web server/server, a connector module coupled to the web server/server, and a bot detection computer/server. The connector module further comprises a storage variable generation module. The bot detection computer/server comprises a bot detection module and a bot signature database. The client computing device is installed with a client application configured to send HTTP requests. The connector module is coupled to a web server/server, wherein the connector module is configured to receive the HTTP request. The connector module is also configured to initiate an API call to the bot detection computer/server for every HTTP request received from the client application. The bot detection computer/server is coupled to the web server/server over a computer network. The storage variable generation module is configured to generate a plurality of storage variables corresponding to the HTTP request.

According to an embodiment herein, the connector module is further configured to inject storage variables in an HTTP response sent from the web server/server to the client application by a connector module. The connector module is further configured to inject a JavaScript code snippet into the HTTP response sent to the client application, wherein the JavaScript code snippet is configured to collect client-side parameters. Also, the connector module is further configured to injecting storage variables in an HTTP response sent from web server/server to the client application; and block HTTP requests from the client application in response to detection of a bot.

According to an embodiment herein, the bot detection computer/server is configured to analyze the plurality of storage variables and client-side parameters to detect bots. The bot detection computer/server is also configured to generate a bot signature database in the bot detection computer/server.

According to an embodiment herein, the bot detection computer/server is configured to analyze the plurality of storage variables by tracking visitors accessing the client application using 'A' storage variable and IP address of the client application. Further, the storage variable generation module is configured to increment 'C' storage variable on each HTTP request from the client application. The bot detector/computer determines a visitor as a bot when the 'C' storage variable is not incremented, wherein a bot without storage capabilities is incapable of incrementing the 'C' storage variable.

According to an embodiment herein, the bot detection computer/server is configured to analyze the plurality of storage variables by analyzing the 'A' and 'C' storage variables across a plurality of HTTP requests. The bot detector/computer determines a spoofing of storage variables if the 'C' storage variables remains same for the plurality of HTTP requests. Also, the bot detector/computer analyzes the plurality of storage variables by determining a visitor as a distributed bot when a single 'A' storage variable is received from multiple IP address. Also, the bot detector/computer is configured to analyze the plurality of storage variables by determining a visitor as a bot when a single 'A' storage or IP address makes requests at a high rate. The bot detector/computer is configured to analyze the plurality of storage variables by analyzing time series anomalies between the pluralities of HTTP requests. The bot detector/computer determines interarrival time between successive requests from the same IP or 'A' has a standard deviation close to zero.

According to an embodiment herein, the connector is configured to analyze the plurality of storage variables by blocking requests by analysis with the replica of bot signature database; and blocking requests by using an asynchronous feed. Further, the connector is configured to block requests by analysis with the replica of bot signature database by comparing the HTTP request at the connector module with the replica of bot signature database before initiating API call. The HTTP response is provided to the client application immediately after analysis, thereby reducing a delay involved in providing HTTP response and blocking the HTTP request when a bot is detected after comparison with the bot signature database.

According to an embodiment herein, the connector module is configured to block requests by analysis with the replica of bot signature database by providing the HTTP response to the client application immediately in response to the HTTP request. The bot detection module analyses data received through the API calls at the bot detection computer/server to compute bot signatures. Further, the computed bot signatures are provided asynchronously through a feed to the web server/server. The connector module applies the computed bot signatures in one of a Content Delivery Network (CDN), Web Application Firewall (WAF), and hardware appliance present at the web server. Thus, the connector module blocks consecutive HTTP request from a bot at one of a CDN, WAF, and hardware appliance using the computed bot signatures.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The shortcomings discussed in the prior art are addressed by a system and method for detecting bot traffic using storage variables. The embodiments herein disclose a system and method for preventing malicious access of the web servers/servers by bots for purposes like web scraping and data extraction by generating storage variables. The storage variables analyze human behavior and distinguish human traffic from bot traffic. According to the embodiments herein, the client application sends a data/content/action request to the server. Along with the client request, a bunch of storage variables are created which tracks the users' activity on the client application. The system envisaged by the embodiments herein generates a plurality of storage variables including a unique identifier, counter storage variable and timestamp when a client application sends a request to a server. The plurality of storage variables further analyses activity of the client application to determine bot traffic.

According to an embodiment herein, a computer implemented method for detecting and blocking bots in a client application or web server is disclosed. The method includes receiving a HTTP request from a client application by a connector module. Further, a plurality of storage variables corresponding to the HTTP request is generated by a storage variable generation module. Thereafter, an API call is initiated to a bot detection computer/server for every HTTP request generated from the client application. The API call initiates generation of a 'A' storage variable, 'C' storage variable, and timestamp storage variables using a storage variable generation module. Further, storage variables are injected in an HTTP response sent from web server to the client application by a connector module. A JavaScript code snippet is injected into the HTTP response sent to the client application. The JavaScript code snippet is configured to execute at the client application to collect client-side parameters. The plurality of storage variables and client-side parameters are analyzed by the bot detection computer/server to detect bots. A bot signature database is generated in the detection provider's computer/server, wherein the bot signature database is stored in the bot detection computer/server and a replica of bot signature database can be stored in the web server/server. Further, action is taken on subsequent HTTP requests from the client application in response to detection of a bot, wherein the action includes one of blocking HTTP request, displaying captcha, and displaying fake data.

According to an embodiment herein, the step of analyzing the plurality of storage variables includes tracking visitors accessing the client application using 'A' storage variable and IP address of the client application. Further, the 'C' storage variable is incremented on each HTTP request from the client application. A visitor is determined as a bot when the 'C' storage variable is not incremented, wherein a bot without storage capabilities is incapable of incrementing the 'C' storage variable.

According to an embodiment herein, the step of analyzing the plurality of storage variables includes analyzing the 'A' and 'C' storage variables across a plurality of HTTP requests. Further, a spoofing of storage variables is determined when the 'C' storage variable remain the same for the plurality of HTTP requests.

According to an embodiment herein, the step of analyzing the plurality of storage variables includes determining a visitor as a distributed bot when a single 'A' storage variable is received from multiple IP address.

According to an embodiment herein, a visitor is determined as a bot when a single 'A' storage or IP address makes requests at a high rate.

According to an embodiment herein, the step of analyzing the plurality of storage variables includes analyzing time series anomalies between the plurality of HTTP requests; and determining interarrival time between successive requests from the same IP or 'A' has a standard deviation close to zero.

According to an embodiment herein, the step of blocking requests comprises blocking requests by analysis with the replica of bot signature database and blocking requests by using an asynchronous feed. In the method of blocking requests by analysis with the replica of bot signature database, the HTTP request at the connector module are compared with the replica of bot signature database before initiating API call. Further, the HTTP response is provided to the client application immediately after analysis, thereby reducing a delay involved in providing HTTP response. Thereafter, the HTTP request is blocked when a bot is detected after comparison with the bot signature database. In the method of blocking requests by using an asynchronous feed, the HTTP response is provided to the client application immediately in response to the HTTP request. Further, data received through the API calls is analyzed at the bot detection computer/server to compute bot signatures. Subsequently, the computed bot signatures are provided asynchronously through a feed to the web server. The computed bot signatures are applied in one of a Content Delivery Network (CDN), Web Application Firewall (WAF), and hardware appliance present at the web server. Further, consecutive HTTP request from a bot is blocked at one of a CDN, WAF, and hardware appliance using the computed bot signatures.

According to an embodiment herein, a system for detecting and blocking bots in a client application or web server is disclosed. The system includes a client computing device or client computer, a server/web server, a connector module coupled to the web server, and a bot detection computer/server. The connector module comprises a storage variable generation module. The bot detection computer/server comprises a bot detection module, a bot signature database. The client computing device is installed with a client application configured to send a HTTP request. The connector module is coupled to a web server/server, wherein the connector module is configured to receive the HTTP request. The connector module is also configured to initiate an API call to a bot detection computer/server for every HTTP request received from the client application. The bot detection computer/server is coupled to the web server over a computer network. The storage variable generation module is configured to generate a plurality of storage variables corresponding to the HTTP request.

According to an embodiment herein, the connector module is further configured to inject storage variables in an HTTP response sent from web server/server to the client application by a connector module. The connector module is further configured to inject a JavaScript code snippet into the HTTP response sent to the client application, wherein the JavaScript code snippet is configured to collect client-side parameters. Also, the connector module is further configured to injecting storage variables in an HTTP response sent from web server/server to the client application; and block HTTP requests from the client application in response to detection of a bot.

According to an embodiment herein, the bot detection computer/server is configured to analyze the plurality of storage variables and client-side parameters in the HTTP response by the bot detection computer/server to detect bots. The bot detection computer/server is also configured to generate a bot signature database in the bot detection provider's computer/server.

According to an embodiment herein, the bot detection computer/server is configured to analyze the plurality of storage variables by tracking visitors accessing the client application using 'A' storage variable and IP address of the client application. Further, the bot detection computer/server is configured to increment 'C' storage variable on each HTTP request from the client application. The bot detection computer/server determines a visitor as a bot when the 'C' storage variable is not incremented. However, a bot without storage capability is incapable of incrementing the 'C' storage variable.

According to an embodiment herein, bot detection computer/server is configured to analyze the plurality of storage variables by analyzing the 'A' and 'C' storage variables across a plurality of HTTP requests. The bot detection computer/server determines a spoofing of storage variables if the 'C' storage variables remains same for the plurality of HTTP requests. Also, the bot detection computer/server analyzes the plurality of storage variables by determining a visitor as a distributed bot when a single 'A' storage variable is received from multiple IP address. Also, the bot detector/computer is configured to analyze the plurality of storage variables by determining a visitor as a bot when a single 'A' storage or IP address makes requests at a high rate. The bot detector/computer is configured to analyze the plurality of storage variables by analyzing time series anomalies between the pluralities of HTTP requests. The bot detector/computer determines interarrival time between successive requests from the same IP or 'A' has a standard deviation close to zero.

According to an embodiment herein, the connector is configured to analyze the plurality of storage variables by blocking requests by analysing with the replica of bot signature database; and blocking requests by using an asynchronous feed. Further, the connector is configured to block requests by analysis with the replica of bot signature database by comparing the HTTP request at the connector module with the replica of bot signature database before initiating API call. The HTTP response is provided to the client application immediately after analysis, thereby reducing a delay involved in providing HTTP response and blocking the HTTP request when a bot is detected after comparison with the bot signature database.

According to an embodiment herein, the connector module is configured to block requests by analysis with the replica of bot signature database by providing the HTTP response to the client application immediately in response to the HTTP request. The connector module analyses data received through the API calls at the bot detection computer/server to compute bot signatures. Further, the computed bot signatures are provided asynchronously through a feed to the web server. The connector module stores the computed bot signatures in one of a Content Delivery Network (CDN), Web Application Firewall (WAF), and hardware appliance present at the web server. Thus, the connector module blocks consecutive HTTP request from a bot at one of a CDN, WAF, and hardware appliance using the computed bot signatures.

Figure 1:
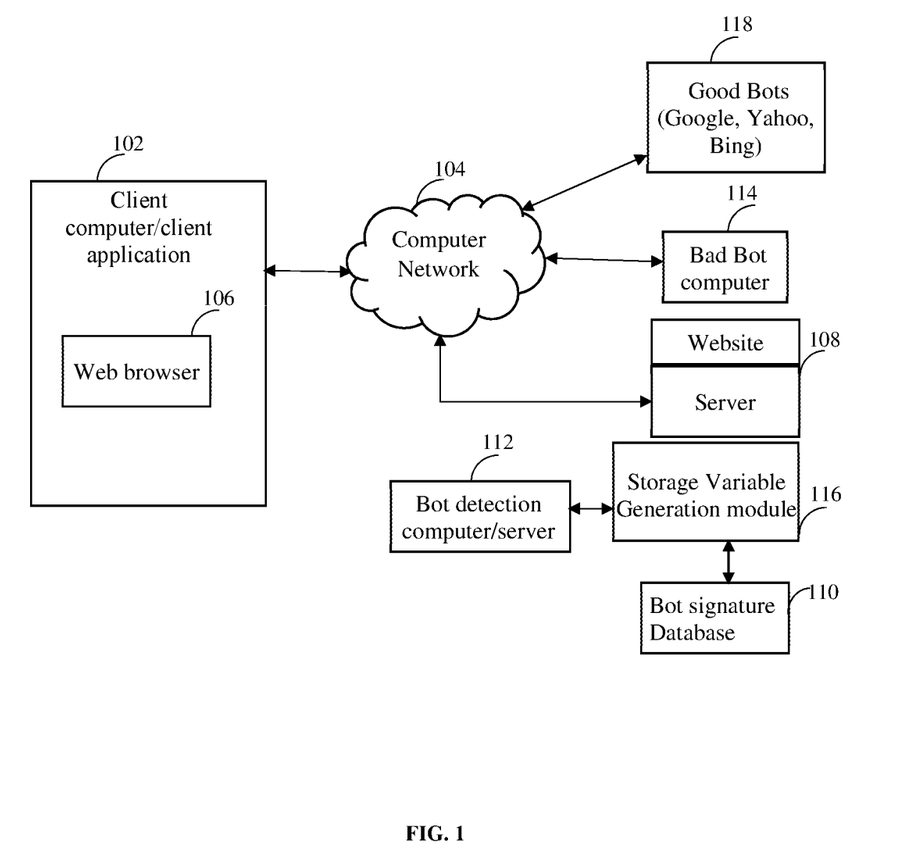
FIG. 1 is a block diagram of a distributed computer system environment incorporating bot detection system, according to an embodiment herein.

FIG. 1 is a block diagram of a distributed computer system environment incorporating bot detection system 112, according to an embodiment herein. The system for detecting bot traffic using storage variables includes a client device 102, a computer network 104, a client application 106, a bot detector 112, a bad bot computer 114, a storage variable generation module 116, and a server 108. The client application 106 executes on the client device or client computer 102 to connect through the computer network 104 to a server/web server 108, to access information requested by a user. The bot detector 112 analyses the presence of bad bots in incoming traffic of the client application. Examples of the server 108 include but are not limited to a database server, a file server, a mail server, a print server, a web server, a proxy server, an application server, an ad server, an ad network server and an API server.

The computer network 104, such as a local area network (LAN), wide area network (WAN), the Internet, or a combination thereof, connects the bot detector 112 and the client device 102. Further, the client device 102 connects to the computer network 104. The bad bot computer 114 is programmed directly by attackers, or it contacts other bots, online forums, or other locations/devices to obtain instructions. The system includes good bots 118 like Google®, Yahoo® and Bing®, etc.

According to an embodiment herein, the user device, such as the client device 102 submits a page content request (a URL) to the server 108. According to an embodiment herein, the page content (a results page) is provided to the client device 102 in response to the request. Client device 102 is any device comprising a client application and enabled to interact with a server-side application. Examples of the client device include, but are not limited to a desktop computer, a laptop computer, a smartphone, a tablet, a wearable computing device, a smart television, a display device, a server and the like. The bot detector 112 is coupled to the server. The server is coupled to a storage variable generation module 116 to generate a plurality of storage variables. The bot detector 112 communicates with a bot signature database 110 to analyze stored data (corresponding to HTTP requests) to determine bot traffic. The bot signature database 110 comprises information corresponding to the detected bot signatures, malignant IP addresses, websites and the like.

According to an embodiment herein, examples of client application include but are not limited to a web browser, a desktop browser, a mobile browser, native apps including Android, IOS, windows, an API client and the like.

According to an embodiment herein, examples of the local storage/database incorporating storage variables in IOS devices include Core Data, SqLite, and Propertylist. In an example, storage variables are cookies. Further, examples of the local storage/database in the web browser include files, SQLite, sessions, localDb and cookies.

According to an embodiment herein, the bot computers 114 submits a client request to the server 108. The submissions of the bad bot computer 114 to the client application 106 influences content/data provided by the server 108, to cause content theft, web scraping, form spam, account takeovers, bid shilling and sniping, clicking through advertising links on the page content, determine client application vulnerabilities, launch spamming attacks, launch phishing attacks, and the like.

The server 108 stores information about the client request 116 from the Client device 102 or bot computers 114 in a historical database. The historical database contains information about the client request, the time at which the request was issued, the set of results returned to the user, and properties of the request (for example, user-agent and the IP (Internet protocol) address, storage variables, and other HTTP information associated with the request).

According to an embodiment herein, the bot detector 112 is configured to identify malicious requests by auditing the bot signature database, the historical database, and validates the integrity of the storage variable generator logic used to generate a plurality of storage variables. The bot detector 112 prevents web scraping and potential attacks by identifying traffics generated by the bot by analyzing pattern of the storage variables. The types of storage variables that are generated and stored to identify the client includes, but are not limited to a unique identifier (A), a counter that can be updated at each request (C), date when the user first visited a data/content (B), and Date when the user/client application sent previous requests to the server (D). The aforementioned storage variables are stored in one of a local storage/database or flash storage of the client device. Further, implementing combination rules on all the storage variables and thresholds makes it difficult for the bot computer to generate expected pattern of storage variables subsequently. On subsequent requests, the storage variables are collected from the client application and updated every time with the new storage variable values generated.

Figure 2:
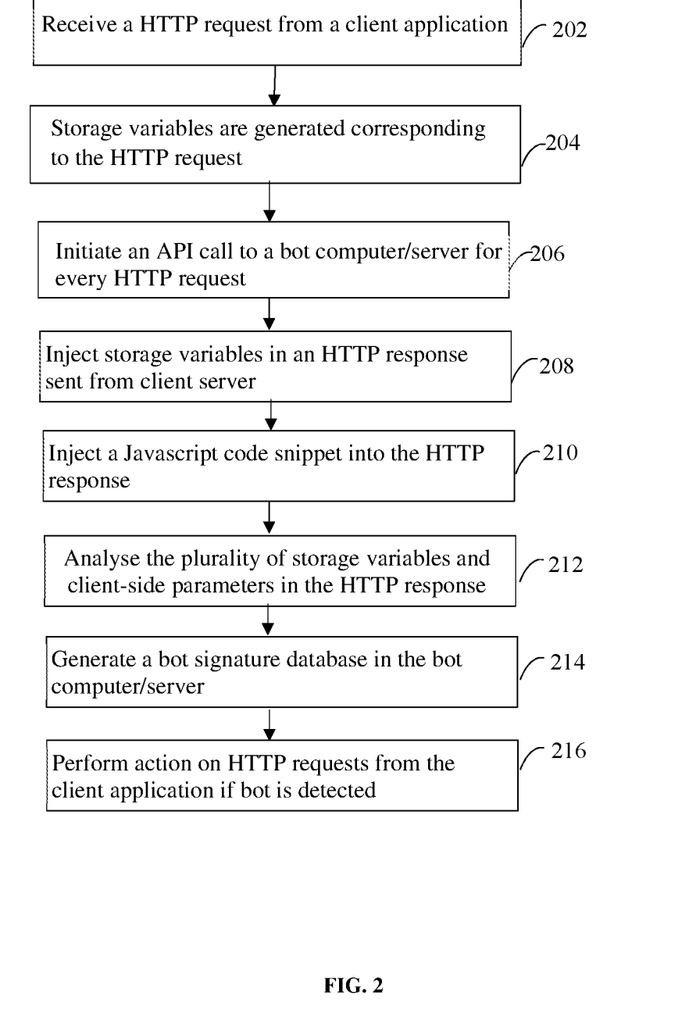
FIG. 2 is a flowchart illustrating a method for bot detection using bot detection system, according to an embodiment herein.

FIG. 2 is a flowchart illustrating a method for bot detection using bot detection system 112, according to one embodiment herein. The method includes receiving a HTTP request from a client application by a connector module. Further, a plurality of storage variables corresponding to the HTTP request is generated by a storage variable generation module. Thereafter, an API call is initiated to a bot detection computer/server for every HTTP request generated from the client application. The API call initiates generation of 'A' storage variable, 'C' storage variable, and timestamp storage variables using a storage variable generation module. Further, storage variables are injected in an HTTP response sent from web server to the client application by a connector module. A JavaScript code snippet is injected into the HTTP response sent to the client application. The JavaScript code snippet is configured to collect client-side parameters. The plurality of storage variables and client-side parameters in the HTTP response are analyzed by the bot detection computer/server to detect bots. A bot signature database is generated in the bot detection computer/server, wherein the bot signature database is stored in the bot detection computer/server and a replica of bot signature database is stored in the web server. Further, action is taken on subsequent HTTP requests from the client application in response to detection of a bot, wherein the action includes one of blocking HTTP request, displaying captcha, and displaying fake data.

According to an embodiment herein, the step of analyzing the plurality of storage variables includes tracking visitors accessing the client application using 'A' storage variable and IP address of the client application. Further, the 'C' storage variable is incremented on each HTTP request from the client application. A visitor is determined as a bot when the 'C' storage variable is not incremented, wherein a bot without storage capabilities is incapable of incrementing the 'C' storage variable.

According to an embodiment herein, the step of analyzing the plurality of storage variables includes analyzing the 'A' and 'C' storage variables across a plurality of HTTP requests. Further, a spoofing of storage variables is determined when the 'C' storage variable remains same for the plurality of HTTP requests.

According to an embodiment herein, the step of analyzing the plurality of storage variables includes determining a visitor as a distributed bot when a single 'A' storage variable is received from multiple IP address. According to an embodiment herein, a visitor is determined as a bot when a single 'A' storage or IP address makes requests at a high rate. According to an embodiment herein, the step of analyzing the plurality of storage variables includes analyzing time series anomalies between the plurality of HTTP requests, and determining interarrival time between successive requests from the same IP or 'A' has a standard deviation close to zero.

According to an embodiment herein, the step of blocking requests comprises blocking requests by analysis with the replica of bot signature database and blocking requests by using an asynchronous feed. In the method of blocking requests by analysis with the replica of bot signature database, the HTTP request at the connector module are compared with the replica of bot signature database before initiating API call. Further, the HTTP response is provided to the client application immediately after analysis, thereby reducing a delay involved in providing HTTP response. Thereafter, the HTTP request is blocked when a bot is detected after comparison with the bot signature database. In the method of blocking requests by using an asynchronous feed, the HTTP response is provided to the client application immediately in response to the HTTP request. Further, data received through the API calls is analyzed at the bot detection computer/server to compute bot signatures. Subsequently, the computed bot signatures are provided asynchronously through a feed to the web server. The computed bot signatures are applied in one of a Content Delivery Network (CDN), Web Application Firewall (WAF), hardware appliance present at the web server. Further, consecutive HTTP request from a bot is blocked at one of a CDN, WAF, and hardware appliance using the computed bot signatures.

According to an embodiment herein, the 'C' storage variable also known as 'C value' generated is hidden with using steganographic techniques. The sequence of steps included in generation of C Value includes:

a) Generate a first five-digit random number between 10000 and 99999, say, 12345 (3*1+7). Generate a second five-digit random number between 10000 and 99999, say, 23456. Concatenate the first five-digit number and the second five-digit number generated in the above 3 steps as a single string.

b) Example value for above condition is: 123451023456 c) When the 'C' storage variable is received from the user. The 'C' storage variable is captured and decoded to get the sequence number. The decoding is performed with the following steps:

a) From the 'C' storage string remove the first 5 digits and the last 5 digits. Store the remaining string for further processing.

b) Convert the above string to a number.

c) Deduct 7 from the number and divide the above result by 3. Thus, we obtain the current sequence number (X) for the 'C' parameter.

d) Take the sequence number (X) generated from the steps (a)-(c) and add 1 to it. Generate a 5 digit random number between 10000 and 99999. (3*(new X+1 value)+7)

e) Generate a 5 digit random number between 10000 and 99999. Concatenate the numbers generated in the above 3 steps as a single string. Example value when X=9, 123453712345.

f) Set the storage's expiry period to 10 years.

According to an embodiment herein, C storage variable is received from the user. Thereafter, the C storage variable is decoded and used to generate the next sequence number in the C storage variable. The process of decoding the C storage variable to derive the sequence number includes the following steps:

a) Eliminating the first <n> (Assuming n=7 here) digits (start as first string) and the last <m> digits (Assuming m=7 here) from the C storage variable string. The resulting string (middle string) after trimming the first 7 and last 7 characters is stored for further processing.

b) Converting the middle string to a number and dividing by (a sum of first digit from the first string and last digit from last string).

c) Subtracting the number by the prime number 2 to get a first output.

d) Dividing the first output by the prime number 1 to obtain the sequence number.

According to an embodiment herein, combination rules are implemented on all the storage variables and threshold values to make it difficult for the bot computer to generate expected pattern of storage variables subsequently. Apart from storage variables, other parameters from the HTTP Header, sessions, are used to identify bots. The rules applied for identification of bots in the exemplary scenario of a web application, based on the number of requests collected in the dataset are as follows:

a. Determining if all requests are being made by the storage variable 'A' and is crossing a threshold in a time duration.

b. Determining if the value of storage variable 'A' and storage variable 'C' are constant for all the requests. The value of storage variable 'A' remains same and storage variable 'C' does not remain constant for a normal user.

c. Identifying that requests are generated from a bot program when the value of storage variable A is distinct and storage variable 'C' is constant for all the requests.

d. Determining if the value of counter storage variable 'C' is increasing sequentially.

e. Computing the standard deviation for a set of n requests for the storage variable D. A standard deviation value close to zero indicates bot activity.

f. Determining the referrer pattern followed for surfing the client application. Typically, a human surfing on the client device will proceed from one content to other, while sending the referrer of the previous content.

g. Determining if the URLs visited are distinct. The aforementioned type of pattern is followed by a bot as they want to extract maximum possible information from the web application.

h. Identifying the bots not having Javascript capability and distinct values for session maintained by the web application, and distinct storage variable 'A' and a constant storage variable 'C' for a data set having 5 to 15 requests. Script based bots fail the above-mentioned test as they have to store the storage variable returned by the server and resend it during the next request.

According to an embodiment herein, maintaining the format of the storage variables as expected by the server is difficult for bots. The embodiments herein implements the method of generation of C storage variable, utilizing storage variable combinations, and storage variable analysis to determine bot traffic.

According to an embodiment herein, the method for bot detection is implemented in client applications such as website security products, mobile applications, firewalls, proxies, and third-party websites or servers. Third party websites or servers are any online business vendor facing a threat from automated bot traffic process such as scraping, data extraction, form spam, content theft, and price scraping.

In an example, when the client application is a web browser, a plurality of storage variables is generated such as to a storage variable 'A', a counter storage variable 'C', timestamp storage variables such as 'B' and 'D' storage variables, wherein 'B' storage variable is the date when the user first visited a website, and 'D' storage variable is the date when the user visited the last page. The storage variables thus generated are stored in a local storage of the web browser.

Figure 3:
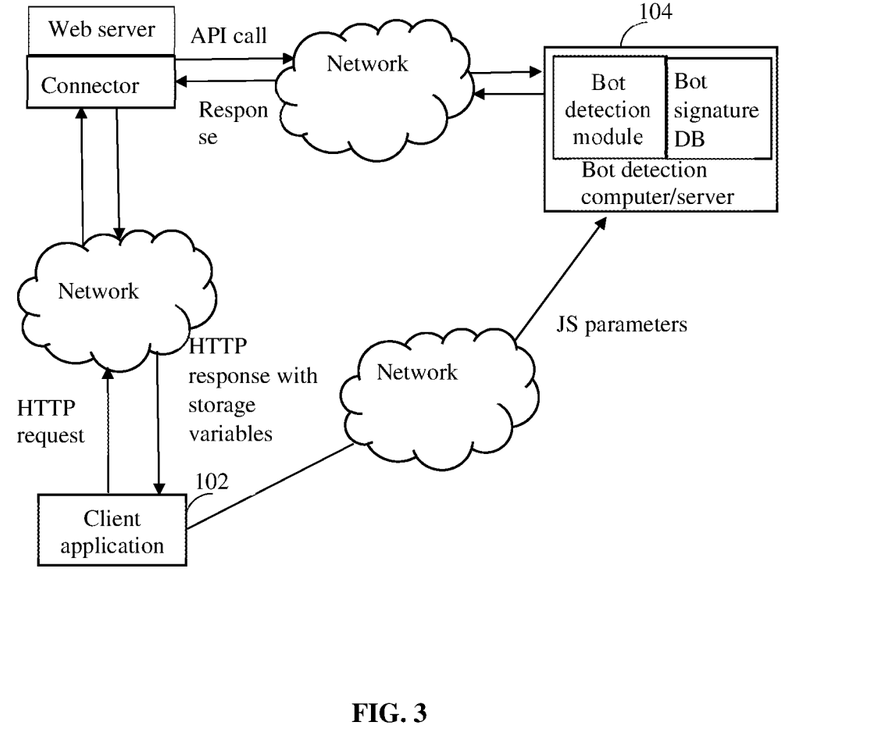
FIG. 3 is a block diagram of the distributed computer system environment with bot detection servers and identifiers, according to an embodiment herein.

FIG. 3 is a block diagram of the distributed computer system environment with bot detection servers and identifiers, according to one embodiment herein. The system includes a connector that is configured to intercept all client requests which come to the web server/server. In response to an HTTP request, a plurality of storage variables is generated. When the HTTP request is sent to the web server/server, the plurality of storage variables is injected into the HTTP request by the connector at web server/server. Further, the connector collects storage variables and other HTTP header parameters and makes an API call to bot detection provider. The connector injects storage variables and JavaScript tags in the response being sent to the clients by the server. If the API call to bot detection computer/server gives response that the incoming request is from a bot, then the connector takes appropriate action. The action includes showing captcha, providing a fake response, showing a block and the like.

Figure 4:
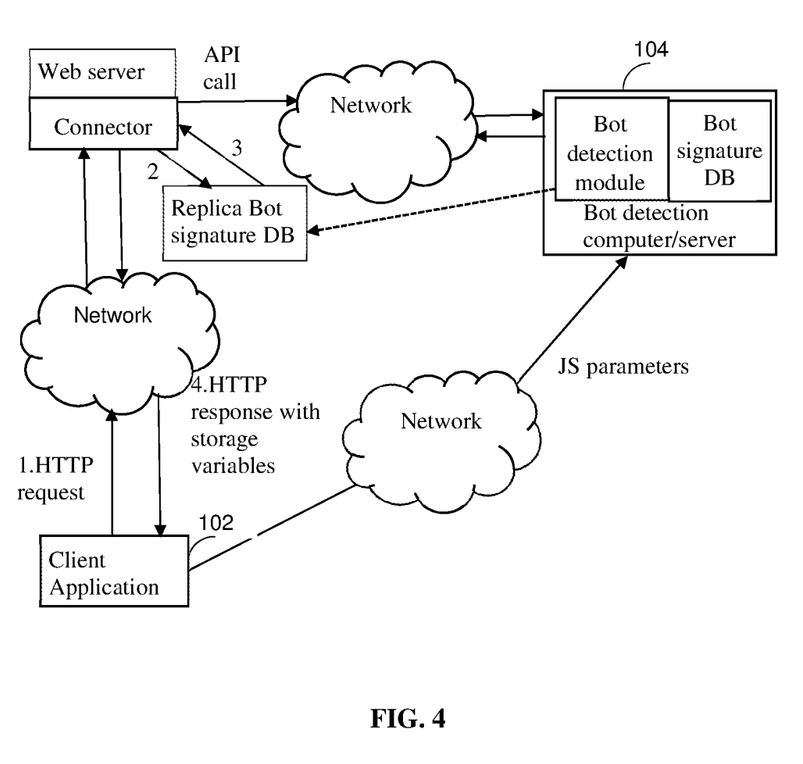
FIG. 4 is a block diagram of distributed computer system environment with bot detection server to reduce delay in displaying webpage in a client application, according to an embodiment herein.

FIG. 4 is a block diagram of distributed computer system environment with bot detection server to reduce delay in displaying webpage in a client application, according to one embodiment herein. Typically, while sending HTTP requests to connector and then transmitting the HTTP request along with storage variables to the bot detector/server, a delay occurs in the process of displaying the webpage on the client application. In order to reduce the time taken for API call, the bot detection provides a replica of bot signature database at the web server's location. The replica database is a slave of the bot signature database available at the bot detection provider's computer/server. Further, the response for the API call is computed using the replica database of the bot signature present at the web server. Thereby reducing the time taken to perform API call.

Figure 5:
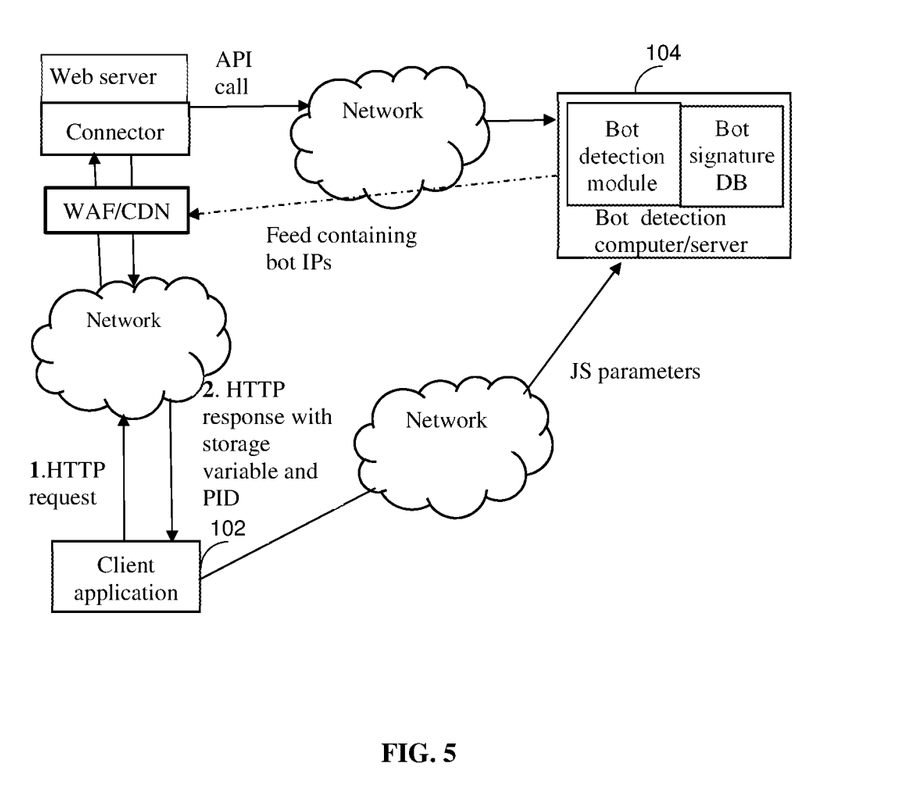
FIG. 5 is a block diagram of distributed computer system environment with bot detection servers and Web Application Firewall implemented alongside the web server/server, according to an embodiment herein.

FIG. 5 is a block diagram of distributed computer system environment with bot detection servers and Web Application Firewall implemented alongside the web server/server, according to one embodiment herein. The system uses an asynchronous feed to collect bot signatures and take action thereupon. Thus, the API calls to bot detection provider proceeds asynchronously without affecting the server's response time.

According to an embodiment herein, the HTTP response is provided from the web server as soon as the request is received. Thereafter, an API call is sent to bot detection provider's computer/server. The bot signatures are computed and stored at the bot detection computer/server side by analyzing data received through API calls. The computed bot signatures are consumed asynchronously through a feed. The collected bot signatures are further used to block requests from a bot at a CDN, Web Application Firewall (WAF) or server level. In an example, the CDN stores a list of IP addresses and a list of blacklisted IPs.

Figure 6:
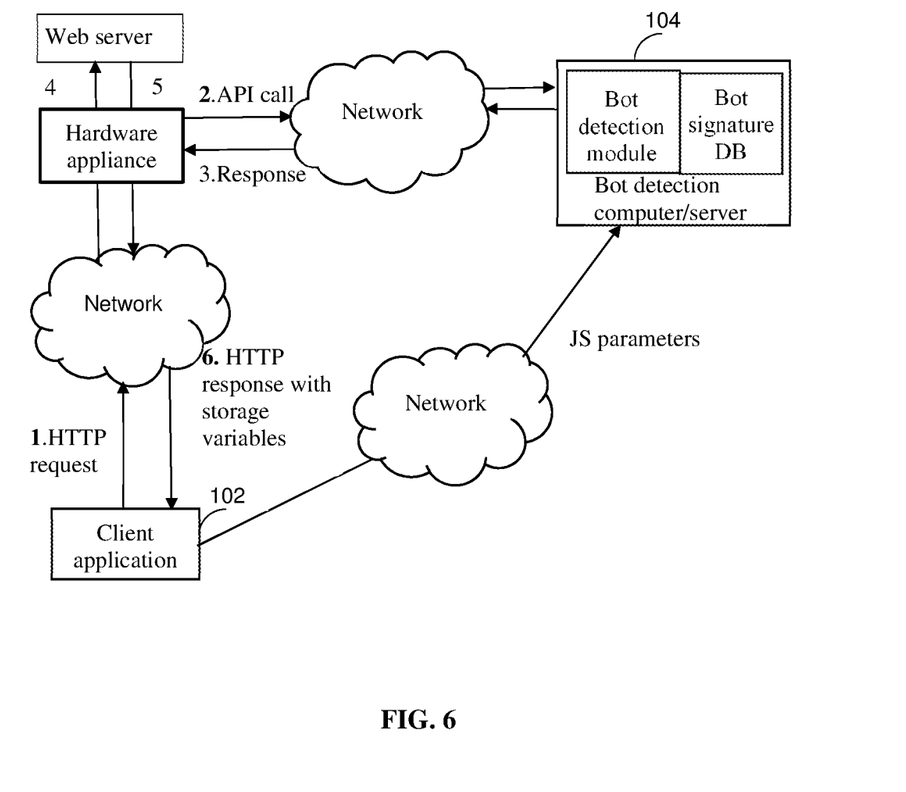
FIG. 6 is a block diagram of distributed computer system environment with bot detection servers and a hardware appliance implemented alongside the web server/server, according to one embodiment herein.

FIG. 6 is a block diagram of distributed computer system environment with bot detection servers and a hardware appliance implemented alongside the web server, according to one embodiment herein. The step of blocking requests comprises blocking requests by analysis with the bot signature database and blocking requests by using a hardware appliance. In the method of blocking requests, the hardware appliance intercepts the HTTP response. The hardware appliance initiates an API call in response to the HTTP request, and further receives a response from the bot detection provider's computer/server. Further, data received through the API calls is analyzed at the bot detection computer/server to detect bots. The HTTP request is blocked by the hardware appliance in response to detection of a bot. If a bot is not detected, the HTTP response is sent to the client application.

The embodiments herein have been described in considerable detail with reference to certain preferred embodiments thereof. Those skilled in this art can readily conceive variations and modifications within the spirit of the embodiments herein. The embodiments herein illustrate the working of the bot detection system only as an illustrative embodiment, and not as a limitation. Those skilled in the art would readily appreciate that the system envisaged by the embodiments herein could be configured to use a plurality of storage variables for bot detection and any other combination rules depending upon the requirements and all such configurations are deemed to be within the scope of the embodiments herein.

The embodiments herein provide a system and method for preventing malicious access of the web servers/servers by bots, using storage variables. The storage variables analyses human behavior and distinguishes human traffic from bot traffic. According to the embodiments herein, the client application sends a data/content/action request to the server, along with the response where a bunch of storage variables are created which tracks the client application. The method for bot detection is implemented in website security products, firewalls, proxies, and third-party websites or servers. Third party websites or servers are protected from facing a threat from automated bot traffic such as scraping, data extraction, form spam, content theft, and price scraping.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer implemented method for detecting and blocking bots, comprising:
   receiving a HTTP request from a client application by a connector;
   generating a plurality of storage variables corresponding to the HTTP request by a storage variable generator;
   initiating an API call by a connector to a bot detection computer for every HTTP request received from the client application;
   injecting storage variables in an HTTP response sent from a web server to the client application by the connector;
   injecting a preset snippet into the HTTP response sent to the client application, and wherein the code snippet is configured to execute at the client application and further transmit client-side parameters to the bot detection server;
   analyzing the plurality of storage variables and client-side parameters in the HTTP response by the bot detection computer to detect bots;
   generating a bot signature based on detection of a bot and storing the generated bot signature in a database in the bot detection computer, wherein the bot signature database is stored in the bot detection computer and a replica of the bot signature database is stored in the web server; and
   performing a preset action on the HTTP requests emerging from the client application in response to detection of a bot, wherein the preset action comprises one of blocking subsequent HTTP requests, displaying a captcha on the client application.

2. The method of claim 1, wherein the plurality of storage variables includes a 'A' storage variable, 'D' storage variable, 'C' storage variable and 'B' storage variable, and wherein 'A' storage variable is a HTTP storage variable used for uniquely identifying a session, and wherein 'D' is a HTTP storage variable used for uniquely identifying a timestamp of a first request, and wherein 'C' is a HTTP storage variable used for identifying the number of pages accessed in the session, and wherein 'B' is a HTTP storage variable used for uniquely identifying the timestamp of a current request.

3. The method of claim 2, wherein analyzing the plurality of storage variables comprises:
   tracking visitors accessing the client application using 'A' storage variable and IP address of the client application;
   incrementing the 'C' storage variable on each HTTP request from the client application; and
   determining a visitor as a bot when the 'C' storage variable is detected to be not incremented.

4. The method of claim 2, wherein the step of analyzing the plurality of storage variables comprises:
   analyzing the 'A' and 'C' storage variables across a plurality of HTTP requests; and
   determining a spoofing of storage variable when the 'C' storage variable remains same for the plurality of HTTP requests.

5. The method of claim 1, wherein the API call initiates generation of a 'A' storage variable, 'C' storage variable, and timestamp storage variables 'B' and 'D' using a storage variable generator.

6. The method of claim 1, wherein the preset snippet is a Javascript code snippet, and wherein the Javascript code snippet is configured to collect client-side parameters.

7. The method of claim 1, wherein analyzing the plurality of storage variables comprises determining a visitor as a distributed bot when a single 'A' storage variable is received from multiple IP address.

8. The method of claim 1, wherein analyzing the plurality of storage variables comprises determining a visitor as a bot when a single 'A' storage or IP address makes requests at a rate higher than a specified threshold.

9. The method of claim 1, wherein analyzing the plurality of storage variables comprises:
   analyzing time series anomalies between the plurality of HTTP requests; and
   determining interarrival time between successive requests from a same IP address or 'A' has a standard deviation that is substantially zero.

10. The method of claim 1, wherein performing preset action by blocking subsequent requests further comprises:
    blocking requests by analysis with the replica of bot signature database; and
    blocking requests by using an asynchronous feed.

11. The method of claim 1, wherein blocking subsequent requests by analysis with the replica of bot signature database further comprises:
    comparing the HTTP request at the connector with the replica of bot signature database before initiating API call;
    providing the HTTP response to the client application immediately after analysis, thereby reducing a delay involved in providing HTTP response; and
    blocking the HTTP request when a bot is detected after comparison with the bot signature database.

12. The method of claim 1, wherein blocking subsequent requests by using an asynchronous feed further comprises:
    providing the HTTP response to the client application immediately in response to the HTTP request;
    analyzing data received through the API calls at the bot detection computer to compute bot signatures;
    providing the computed bot signatures asynchronously through a feed to the web server;
    storing the computed bot signatures in one of a Content Delivery Network (CDN), Web Application Firewall (WAF), and hardware appliance present at the web server; and
    blocking consecutive HTTP request from a bot at one of a CDN, WAF, and hardware appliance using the computed bot signatures.

13. A system for detecting and blocking bots, comprising:
    a bot detection computer; and
    a connector connected to a web server, wherein the connector is comprised of at least processing hardware adapted to receive an HTTP request of a client application sent from a client computing device, wherein the connector is further adapted to initiate an API call to the bot detection computer for every HTTP request received from the client application, and wherein the connector comprises a storage variable generator, and wherein the storage variable generator comprises at least processing hardware adapted to generate a plurality of storage variables corresponding to the HTTP request;

wherein the bot detection computer is coupled to the web server over a computer network, and wherein the bot detection computer is adapted to perform a preset action on every HTTP request emerging from the client application in response to detection of a bot;

wherein the bot detection computer is further adapted to:
analyze the plurality of storage variables and client-side parameters in an HTTP response to detect bots, and generate a bot signature based on detection of a bot and storing the generated bot signature in a database in the bot detection computer, wherein the bot signature database is stored in the bot detection computer and a replica of the bot signature database is stored in the web server.

14. The system of claim 13, wherein the preset action comprises one of blocking subsequent HTTP requests, and displaying a captcha on the client computing device.

15. The system of claim 14, wherein the bot detection computer comprises a bot detector and a bot signature database.

16. The system of claim 13, wherein the connector is configured to:
inject storage variables in the HTTP response sent from web server to the client application;
inject a code snippet into the HTTP response sent to the client application, wherein the JavaScript code snippet is configured to collect client-side parameters;
inject storage variables in an HTTP response sent from web server to the client application; and
block HTTP requests from the client application in response to detection of a bot.

17. The system of claim 13, wherein the bot detection computer is further configured to:
track visitors accessing the client application using 'A' storage variable and IP address of the client application;
increment a 'C' storage variable on each HTTP request from the client application; and
determine a visitor as a bot when the 'C' storage variable is detected to be not incremented, wherein the 'C' storage variable is a HTTP storage variable used for identifying the number of pages accessed in a session.

18. The system of claim 13, wherein the bot detection computer is further configured to:
analyze a 'A' storage variable and a 'C' storage variable across a plurality of HTTP requests; and
determine a spoofing of storage variables if the 'C' storage variables remains same for the plurality of HTTP requests.

19. The system of claim 13, wherein the bot detection computer is configured to analyze the plurality of storage variables by determining a visitor as a distributed bot when a constant 'A' storage variable is received from multiple IP address, wherein the 'A' storage variable is a HTTP storage variable used for uniquely identifying a session.

20. The system of claim 13, wherein the bot detection computer is configured to analyze the plurality of storage variables by determining a visitor as a bot when a single 'A' storage or IP address makes requests at a rate higher than a specified threshold.

21. The system of claim 13, wherein the bot detection computer is configured to:
analyze time series anomalies between the plurality of HTTP requests; and
determine interarrival time between successive requests from a same IP address or 'A' has a standard deviation that is substantially zero.

22. The system of claim 13, wherein the connector is configured to perform a preset action of blocking subsequent requests by analysis with the replica of bot signature database and blocking requests by using an asynchronous feed.

23. The system of claim 13, wherein the connector is further configured to:
compare the HTTP request at the connector with the replica of bot signature database before initiating the API call;
provide the HTTP response to the client application immediately after analysis, thereby reducing a delay involved in providing the HTTP response; and
block the HTTP request when a bot is detected after comparison with the bot signature database.

24. The system of claim 13, wherein the connector is further configured to:
provide the HTTP response to the client application immediately in response to the HTTP request;
analyze data received through the API calls at the bot detection computer to compute bot signatures;
provide the computed bot signatures asynchronously through a feed to the web server;
store the computed bot signatures in one of a Content Delivery Network (CDN), Web Application Firewall (WAF), and hardware appliance present at the web server; and
block consecutive HTTP request from a bot at one of a CDN, WAF, and hardware appliance using the computed bot signatures.

* * * * *